Feb. 23, 1932.                F. J. OVEN                1,846,401
                               GASKET
                         Filed Oct. 30, 1929
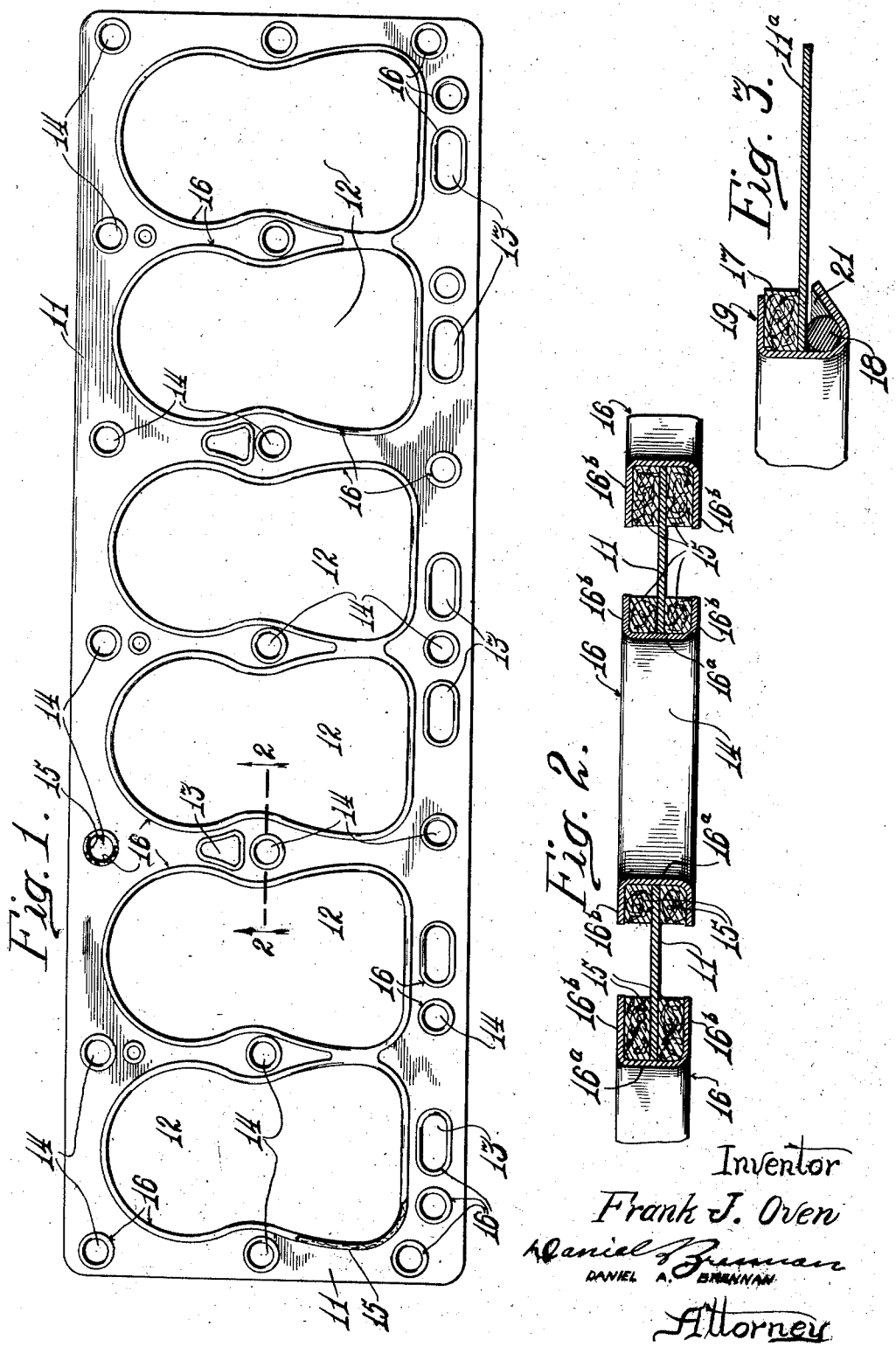

Patented Feb. 23, 1932

1,846,401

UNITED STATES PATENT OFFICE

FRANK J. OVEN, OF CHICAGO, ILLINOIS, ASSIGNOR TO VICTOR MANUFACTURING & GASKET CO., OF CHICAGO, ILLINOIS, A CORPORATION OF ILLINOIS

GASKET

Application filed October 30, 1929. Serial No. 403,521.

This invention relates in general to gaskets, and more particularly to gaskets for use in the presence of high temperatures and pressures and susceptible of being distorted to form a tight seal, the invention having particular utility for sealing joints in an internal combustion engine as, for example, between the cylinder block and head.

The sealing effect of a cylinder head gasket is principally localized about the openings therein, particularly those openings which register with the cylinders and water ports of the cylinder block and head, and it is the object of my invention to provide an inexpensive gasket comprising a metal body layer having openings therein with the seating and sealing means located on both sides of the body and confined to the marginal edges about the openings therein.

And a further object of the invention is to secure the seating and sealing means upon the marginal edges of the body layer about the openings therein by retaining means which pass through the openings and provide the walls therefor and overlap the seating and sealing means.

In the accompanying drawings:

Fig. 1 is a plan view of a gasket embodying the invention.

Fig. 2 is an enlarged transverse sectional view on the line 2—2 of Fig. 1.

Fig. 3 is a detail sectional view showing a modified form of the invention.

Referring to the drawings, the body 11 is made preferably of a single layer of inexpensive material such as sheet iron or steel and it is provided with the usual cylinder openings 12, water openings 13, and bolt openings 14. A narrow strip of gasket material 15, such as asbestos, is arranged on the marginal edge of the body layer about some or all of the openings and on each side of the body layer and these strips are held in place by retaining flanges 16. These flanges are of tubular form and they extend through the openings in the body layer, their webs 16a forming the walls of said openings, and their flanges 16b overlapping the strips 15 to hold the strips in proper position upon the body layer. The seating strips may be omitted from the bolt openings but it is preferred that they should be used at all openings to better serve the purpose of aligning and leveling the gasket in the joint to which it is applied and to evenly and uniformly distribute the pressure over the gasket. The seating strips, and also the retainers, may be separate for each opening or some of them may be connected as shown in Fig. 1. Generally speaking, however, the strips of one opening will be spaced from the strips of another opening and between the strips the body layer is entirely bare. Thus much less gasket material is used than would be the case if the body layer was entirely covered with gasket material. In Fig. 3 the body layer 11a is provided on one side with a strip 17 of gasket material about an opening in the body and on the other side with a metal strip 18 preferably made of soft wire, these strips being held in place by a retainer 19 substantially like the retainer 16 except that it is bent over the wire strip 18 obliquely toward the body layer to form an enclosed cooling space 21 about the wire strip.

The invention provides a novel gasket in which the materials employed for seating and sealing the gasket are confined to the marginal edges of the gasket about the openings therein whereby the cost of materials required is considerably reduced and at the same time a gasket may be provided having required stability and producing an efficient seal.

I claim:—

1. A gasket comprising a metal body layer having openings therein, a filler ring on the marginal edge of the body layer about each opening and on each side of the body layer, and a flanged retaining sleeve extending through and forming the wall of the opening and overlying said filler rings, said filler rings being confined to the marginal edges of the body layer about the openings therein.

2. A gasket comprising a metal body layer having openings therein, a filler ring on the marginal edge of the body layer about each opening and on each side of the body layer, and a flanged retaining sleeve extending through and forming the wall of the opening and holding said filler rings in seating position about the opening, said filler rings being made of compressible asbestos gasket material and being confined to the marginal edges of the body layer about the openings therein and spaced from the filler rings of adjacent openings.

3. A gasket comprising a metal body layer having openings therein, a filler ring of asbestos gasket material confined to the marginal edge of the body layer about each opening and on one side of the body layer, a metal filler on the marginal edge of the body layer about each opening and on the other side of the body layer, and a flanged retaining sleeve extending through and forming the wall of the opening and overlying said filler rings to retain them in place on the body layer.

4. A gasket comprising a body portion made of a single sheet of metal having openings, a refractory filler around said openings on one side of said body portion, a metal filler around said openings on the other side of said body portion, and means for holding said fillers in place, said holding means overlying said refractory fillers, extending through said openings and underlying said metal fillers and contacting when under pressure with the body of the gasket remote from said metal fillers to provide cooling spaces about said metal fillers.

In testimony whereof I affix my signature at 10 South LaSalle Street, Chicago, Illinois.

FRANK J. OVEN.